Figure 1:
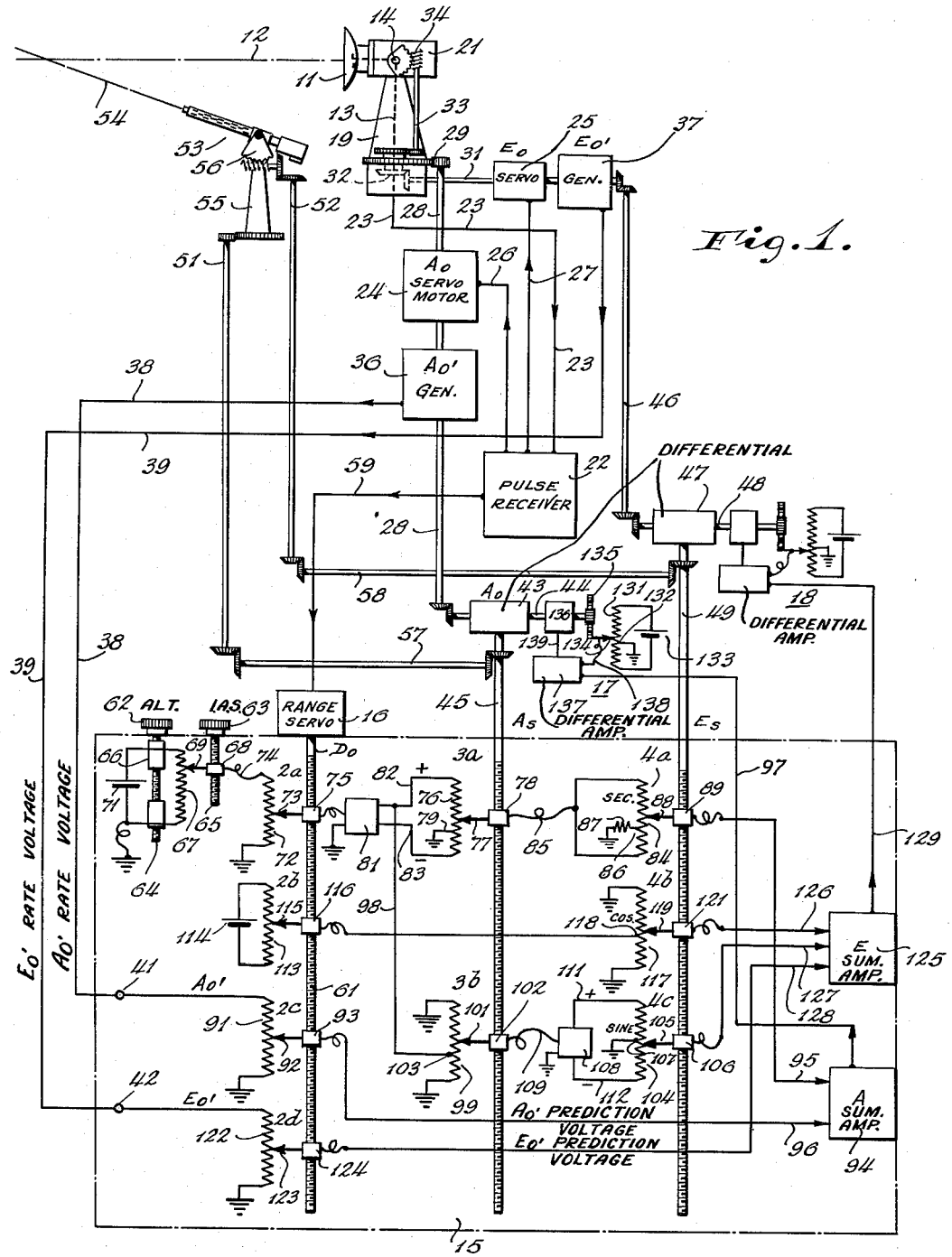

Dec. 13, 1955

G. E. WHITE 2,726,810

ELECTRIC FIRE CONTROL COMPUTER

Filed March 25, 1943

2 Sheets-Sheet 1

INVENTOR
GIFFORD E. WHITE
BY Paul B. Hunter
ATTORNEY

Dec. 13, 1955

G. E. WHITE 2,726,810

ELECTRIC FIRE CONTROL COMPUTER

Filed March 25, 1943

2 Sheets-Sheet 2

INVENTOR
GIFFORD E. WHITE
BY
ATTORNEY

United States Patent Office 2,726,810
Patented Dec. 13, 1955

2,726,810

ELECTRIC FIRE CONTROL COMPUTER

Gifford E. White, Hempstead, N. Y., assignor to The Sperry Rand Corporation, a corporation of Delaware Application March 25, 1943, Serial No. 480,573

15 Claims. (Cl. 235—61.5)

My invention relates to fire control arrangements and computers therefor particularly suitable for airborne ordnance.

My invention has for its object the provision of improved methods and apparatus for ascertaining and applying requisite corrections for training an airborne gun upon a target.

A further object of my invention is to provide means for computing corrections electrically, particularly means suitable for mounting on an automatic target tracker.

An additional object of my invention is to provide an automatic target-responsive gun-directing system in which no optical system is required, in which a minimum number of servo mechanisms is needed and which operates over the same angle as available radio scanners.

Still another object of my invention is to provide electrical computers for carrying out computations on electrical and mechanical input quantities.

Other and further objects and advantages will become apparent as the description proceeds.

In accordance with my invention in its preferred form, I make use of an automatic target tracking system of the radio type which has a radio line of sight and a tracking head which follows the target in azimuth and in elevation. For producing gun data or indications of the angular positions in azimuth and elevation of the gun requisite to cause the projectile to strike the target, I provide an electrical computer which computes the ballistic corrections and the correction for rate of movement of the target or gun lead. The computer comprises sets of potentiometers certain of which are energized in tandem so as to produce successive voltages representing results of introducing various corrections.

Variable voltages derived from the tracking system are introduced into the electric computer for energizing certain of the potentiometers and the mechanical motions derived from the radio tracking system are introduced into the computer for operating sliding brushes cooperating with the potentiometers. Suitable summation circuits are provided for combining the electrical outputs of various potentiometers and electro-mechanical conversion devices are provided for converting electrical outputs into mechanical displacements which may be combined with the present position motions of the radio tracker for either driving the gun directly or indicating the requisite gun position.

A better understanding of my invention will be afforded by the following detailed description considered in connection with the accompanying drawings, and those features which are believed to be novel and patentable will be pointed out in the claims appendant thereto.

In the drawings,

Fig. 1 is a schematic diagram of one embodiment of my invention.

Figure 2A:
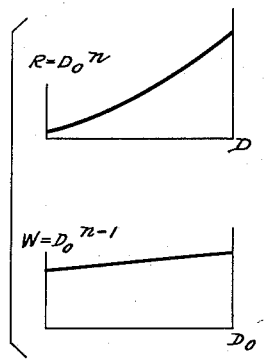

Figs. 2a, b, and c, are pairs of graphs representing resistance variations and card shapes of potentiometers used to produce the factors of the computation depending upon range.

Figure 3A:
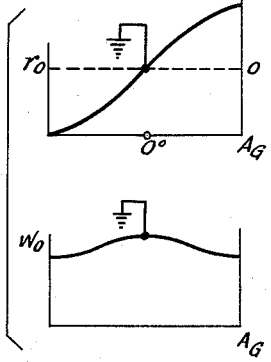
Figure 4A:
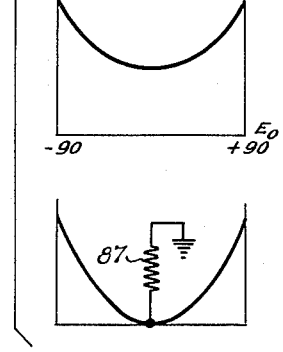
Figure 3B:
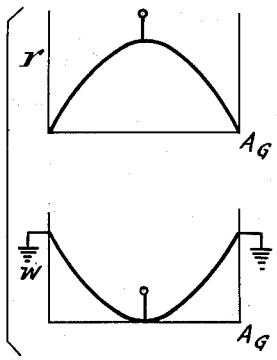

Figs. 3a and 3b are pairs of graphs of resistance variations and card shapes used for producing factors of the computation depending upon gun position in azimuth, and Figs. 4a, b, and c are pairs of graphs of resistance variations and card shapes for producing the factors of the computation depending upon gun position in elevation.

In each case the graph designated r represents the curve of resistance variation with brush movement expressed in terms of angular degrees and the graph designated w represents the requisite card shape to produce the desired resistance variation.

In accordance with my invention, I prefer to utilize a known form of target tracking system generally known as the "Radar" system which is being used to a considerable exent by the armed forces and I may mount on the tracking system the computing arrangement which I have devised for producing an improved automatic target-tracking gun director. I have illustrated my invention in connection with the use of a spinning radiator type of "Radar" tracker having a parabolic radiator 11 spinning about an axis 12 driven by mechanism not shown and mounted so that the spin axis 12 which is also the radio line of sight will be rotated in azimuth about a vertical axis 13 and will be rotated in elevation about a horizontal axis 14. Such a radio tracking system is described in detail in the copending application filed jointly by me, Holschuh, Mieher and Shepherd, now Patent No. 2,617,982 dated November 11, 1952. However, my invention is not limited to use with the particular form of tracking system illustrated. For example, I may also use a radio tracker of a different type such as described in the copending joint application of Barrow, Pensyl and Mieher, now Patent 2,480,829 dated September 6, 1955.

Regardless of the specific form of tracking system employed, I preferably provide an electrical computer arranged as an integral unit which may be removably mounted on the tracking system. As shown in the drawing, the electrical elements of the computer are represented within a rectangular unit 15. Electro-mechanical conversion elements 16, 17 and 18 are shown externally of the unit 15 for converting respectively electrical indication of range into a mechanical motion, and electrical indication of azimuth correction into a mechanical motion and an electrical indication of elevation correction into mechanical motion. In practice, however, the units 16, 17 and 18 may also form a part of the integral unit which may be mounted on the tracking system.

The tracker is shown schematically as having stanchions 19 mounted on a turntable (not separately shown) rotated in azimuth about the vertical axis 13 and a spinner-carrying head 21 supported by trunnions (not shown) in the stanchions 19 so as to be rotated in elevation about the horizontal or trunnion axis 14. The tracking system includes a radio receiver 22 which may be a pulse receiver in the type of tracking system illustrated, having a radio input channel from the parabolic radiator 11 represented schematically by the single line 23 initially following the spin axis 12 and the vertical rotation axis 13. For moving the radiator 11 in azimuth and elevation, I provide schematically represented servomotors 24 and 25, respectively, which are controlled by electrical signals received through channels 26 and 27, respectively, from the pulse receiver 22. The azimuth servomotor 24 drives a shaft 28 connected through gearing 29 to the rotatable turntable and stanchions 19. The elevation servomotor 25 drives a shaft 31 connected through bevel gearing 32, transmission gearing 33 and worm and sector gearing 34 to the elevation head 21.

Suitable means are provided for producing voltages respectively proportional to the rates of motion of the radio line of sight 12 in azimuth and elevation, that is, to the rate of rotation of the shafts 28 and 31, respectively. For this purpose, electrical differentiating circuits may be provided. For the sake of illustration, I have shown dynamic differentiators such as an azimuth generator 36 driven by the azimuth shaft 28, and an elevation generator 37 driven by the elevation shaft 31. For simplicity, single-conductor electrical output connections 38 and 39 respectively are shown from the generators 36 and 37 to rate voltage input terminals 41 and 42 in the computer box 15. A ground electrical return system is assumed.

It will be understood that the angular positions of shafts 28 and 31 represent the actual position of the target or so-called present position, whereas the ballistic corrections necessary to the correct line of fire depend upon the gun position instead of the target present position. For this reason, the present position shafts 28 and 31 are preferably not connected directly into the electrical computer 15. In the case of the azimuth position, a differential 43 is provided for combining the present position of the shaft 28 with a mechanical correction angle of a shaft 44 to produce an angular position of a shaft 45 which represents the required angular position of the gun in azimuth. As shown, the shaft 45 enters the computer box 15. In a similar manner the elevation shaft 31 of the tracking mechanism or a corresponding shaft 46 is connected to one side of a differential 47 having a second input from a shaft 48, the angular position of which represents the correction in elevation. The output of the differential 47 is the shaft 49 which enters the computer box 15.

If desired, and assuming sufficient power is available in the part of the system thus far described, direct mechanical connections may be taken from the gun position shafts 45 and 49 to shafts 51 and 52 for controlling a gun 53. As shown the gun 53 has a line of fire 54 crossing the radio line of sight 12 with the requisite angle to lead the target to allow for its rate of motion and include the ballistic corrections. It will be understood that the shaft 51 rotates the gun turntable stanchions 55 in azimuth through suitable gearing and the shaft 52 likewise controls the elevation of the gun 53 through suitable gearing represented schematically as worm and sector gearing 56. Although all-mechanical means for positioning a gun are described and shown in the drawings, it will be understood that any suitable means for reproducing angular motion at a distance may be used.

For simplicity, I have shown direct mechanical connections through shafts 57 and 58 together with appropriate bevel gearing from the computer azimuth gun shaft 45 to the shaft 51 and from the computer elevation gun position shaft 49 to the shaft 52, respectively. However, my invention is not limited to the arrangement illustrated and it will be understood that my invention does not exclude the use of electrical position transmission systems.

As explained more in detail in the aforesaid application Serial No. 441,188, the pulse receiver 22 which comprises a phase-sensitive amplifier arranged to compare the phase relation of received impulses with a locally generated frequency is used to produce an electrical voltage varying in magnitude with the range of the target being tracked by the radiator 11. A suitable electrical connection 59 is provided between the pulse receiver 22 and the mechanism 16 for converting the electrical range indication of the receiver 22 into mechanical motion of the range shaft 61 driven by the mechanism 16, referred to as a "range servo."

The electrical computing mechanism shown within the rectangle 15 comprises manual adjustments for setting in the altitude and indicated air speed of the supporting aircraft to provide a ballistic correction for the effect of the air speed of the supporting aircraft corrected for changing air density, the latter varying with altitude, and automatic adjustments for setting in the effect of range and both present position and rate of motion of the target in azimuth and elevation. The mechanism for manually correcting for the effect of altitude and indicated air speed comprises a pair of rotatable knobs 62 and 63 secured to threaded shafts 64 and 65, respectively. One of these shafts, for example, the former, has a threaded framework or a pair of nuts 66, threaded thereon, carrying a potentiometer resistance 67. The other threaded shaft carries a nut 68 supporting a brush 69 adapted to slide along the potentiometer resistance 66. A source of current 71 is provided for energizing the potentiometer resistance 66. Preferably, a direct current source is used, and for convenience the source 71 is represented as a battery of dry cells. For simplicity in showing the electrical connections one of the terminals, for example, the negative terminal of the battery 71, is shown as grounded.

The arrangement is such that the voltage with respect to ground of the brush 69 is proportional to a function of altitude H and indicated air speed I. A. S. required in computing the ballistic component of the total lead angle. The arrangement which may be of any suitable design is for the purpose of introducing into the computer a correction for indicated air speed corrected for air density, which varies with altitude. The magnitude of the correction will vary according to the geometric and dynamic characteristics of the particular projectile for which the computer is designed. For example, if desired, the knobs 62 and 63 may be arranged to cooperate with scales (not shown) graduated in logarithms of altitude and indicated air speed, respectively. Conversely the knobs 62 and 63 may be provided with uniformly graduated scales and the potentiometer 67 may be so wound as to cause the resistance from the grounded end toward the ungrounded end to be tapered in accordance with the anti-log of the linear distance from the grounded end toward the ungrounded end. The type of resistance and layout of the scales will vary according to the projectile used, the data therefor being determined empirically from government-supplied ballistic tables.

For modifying the voltage obtained from the brush 69 and introducing the ballistic or windage correction factor which varies with range, a potentiometer 2a is provided comprising a resistance 72 and a sliding brush 73 cooperating therewith. The lower end of the potentiometer resistance 72 is shown as grounded, and the upper end is electrically connected to the sliding brush 69 by a flexible conductor 74.

The range shaft 61 is threaded and has mounted thereon a threaded collar or nut 75 carrying sliding brush 73 which is translated in one way or another by the rotation of the shaft. The potentiometer resistor 72 is so wound that the resistance is tapered as shown in Fig. 2a in accordance with a time of flight correction factor for windage.

For introducing the effect of variations in azimuth on the azimuth windage, a third potentiometer 3a is provided comprising a resistor 76 and sliding brush 77, the latter being carried by a nut 78 threaded on to the gun position azimuth shaft 45. The potentiometer 3a is so wound that the resistance 76 varies in accordance with a suitable function lying intermediate between a linear function and a sine function, as shown by Fig. 3a, and is arranged to provide reversals in polarity of output voltage on brush 77. To this end, an intermediate point 79 of resistance 76 is grounded and the resistance is connected across the output terminals of amplifier 81 which has sliding brush 73 of the potentiometer 2a connected to the ungrounded input terminal thereof.

For introducing the effect of variations in elevation on the azimuth windage, a fourth potentiometer 4a is provided. The potentiometer 4a is arranged to produce a voltage varying as a secant of the gun position in elevation as shown in Fig. 4a. To this end, the potentiometer 4a comprises a resistor 84, the ends of which are electrically connected to the sliding brush 77 of the potentiometer 3a through a flexible conductor 85, and an intermediate terminal 86 which is grounded through an additional resistor 87. A sliding brush 88 carried by a nut 89 threaded on the shaft 49, is provided for the potentiometer.

Figure 2B:
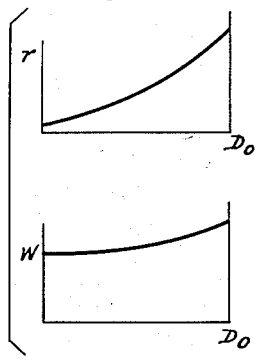
Figure 2C:
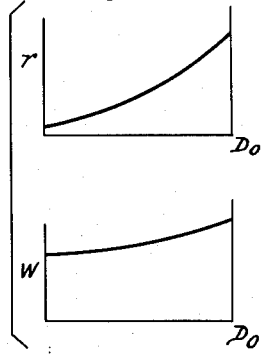

For introducing the prediction component of the lead angle of the gun 53 to take into account the motion of the target, in azimuth, a fifth potentiometer 2c is provided comprising a resistor 91 and cooperating sliding brush 92 carried by a nut 93 threaded on the range shaft 61. The resistor 91 is grounded at the lower end and the upper ungrounded end is connected to the azimuth rate terminal 41 whereby the potentiometer 2c is energized by the generator 36 with a voltage proportional to the angular rate in azimuth of the target. The resistor 91 is so wound that its resistance varies per unit length in accordance with a time of flight function of range as shown in Fig. 2c, the arrangement being such that a voltage proportional to the product of the azimuth rate voltage and time of flight appears on brush 92, which voltage is proportional to the prediction component of the azimuth lead angle. This component is added to the azimuth ballistic component to obtain total lateral deflection by a summation amplifier 94, which may be of any desired type for producing a direct voltage output proportional to the sum of two direct voltage inputs. A suitable circuit for obtaining the sum of independent voltages is shown in Fig. 11 of British Patent 705,362 to Sperry Gyroscope Company, Inc., published March 10, 1954 and relating to a gun directing apparatus. The amplifier 94 is represented schematically by a rectangle as my invention does not reside therein. The input connections are conductors 95 and 96 connected to the brushes 88 and 92 of the potentiometers 4a and 2c, respectively. The summation amplifier 94 is provided with an output terminal connection 97 for controlling the mechanical position of the azimuth correction shaft 44 through the electromechanical conversion unit 17, which will be described more in detail hereinafter. The output of the amplifier is a voltage proportional to the total lateral deflection angle, which is the angle by which the gun must be offset from the line of sight to strike a moving target.

For correcting for the altitude, indicated air speed of the supporting aircraft, and target range in determining the ballistic component of the vertical deflection angle, a voltage is taken from the positive terminal of the isolation amplifier 81 through a conductor 98. For modifying this voltage according to the angular position of the gun in azimuth which must be taken into consideration, a potentiometer 3b is provided comprising a resistor 99, a cooperating sliding brush 101, and a nut 102 carrying the brush 101 and threaded onto the azimuth gun position shaft 45. The potentiometer 3b is arranged as shown in Fig. 3b to effect a variation in voltage in accordance with the cosine of the angular position of the gun in azimuth. For this purpose, the input conductor 98 is connected to a mid-terminal 103 of the resistor 99 and the ends of the resistor 99 are grounded.

For varying the voltage at the brush 101 to take into consideration the angular position of the gun in elevation, a potentiometer 4c is provided comprising a resistor 104, a cooperating sliding brush 105, and a nut 106 carrying the brush 105 and threaded on the elevation gun position shaft 49.

Figure 4B:
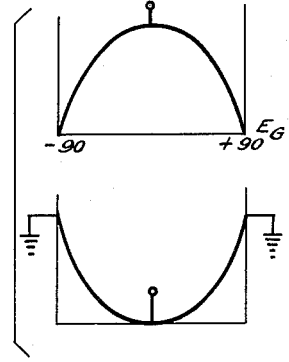
Figure 4C:
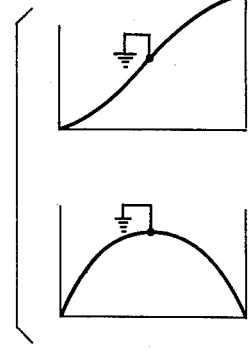

The potentiometer 4c as shown in Fig. 4c is arranged to introduce a sine function of elevation angle. For this purpose the resistor 104 is grounded at a center terminal 107 and is connected across the output terminals of an isolating amplifier 108 having an ungrounded input terminal connected to brush 101 of the potentiometer 3b.

For obtaining a voltage representing the requisite correction in gun elevation due to the effect of gravity, potentiometers 2b and 4b are provided, introducing the effects of variations in time of flight and elevation, respectively. The potentiometer 2b comprises a resistor 113 connected across a source of constant voltage, such as a battery 114, and a sliding brush 115 carried by a nut 116 threaded on the range shaft 61. The resistance of resistor 113 is tapered, as shown by the curve of Fig. 2b in accordance with the time of flight function of range.

The potentiometer 4b is arranged to introduce a voltage variation corresponding to the cosine law, and comprises a resistor 117 with a mid-terminal 118 connected electrically to the brush 115 of the potentiometer 2b, and a cooperating sliding brush 119 carried by a nut 121 threaded on the elevation gun position shaft 49. As previously explained, for introducing the cosine law, the ends of the resistor 117 are grounded.

For computing the prediction component of the elevation lead angle, a rate potentiometer 2d is provided, which comprises a resistor 122 connected between ground and the elevation rate terminal 42, a sliding brush 123 cooperating therewith, and a nut 124 threaded on the range shaft 61 carrying the brush 123. The resistor 122 which is energized by the elevation rate voltage from generator 37 is wound to vary in resistance according to the time of flight function of range the voltage appearing on brush 123 being proportional to the product of the rate voltage and time of flight.

For combining the corrections for elevation windage, gravity, which are ballistic corrections, and the elevation prediction correction, a summation amplifier 125 is provided having three input connections. This amplifier may be constructed along the same line as that disclosed in the British patent referred to above. There is an input connection 126 to the brush 119 of the potentiometer 4b, a second input connection 127 to the brush 105 of the potentiometer 4c, and a third input connection 128 to the brush 123 of the potentiometer 2a. The summation amplifier 125 has an output connection 129 to the electromechanical conversion unit 18 for causing the elevation correction shaft 48 to take up an angular position proportional to the voltage at the summation amplifier output connection 129 which is proportional to the total vertical deflection angle at which the gun must be offset from the line of sight in order for projectiles therefrom to strike a moving target.

The electromechanical conversion units 17, 18 may be of any desired type. In the arrangement illustrated, referring to the azimuth conversion unit 17, there is a reversible polarity potentiometer 131 comprising a resistor with a grounded mid-terminal 132, a source of unidirectional current 133 connected to the ends of resistor 131, and a sliding brush 134. The sliding brush 134 is mechanically connected to the shaft 44 through a rack and pinion gearing 135 converting rotary motion of the shaft 44 into linear translation of the brush 134 along the resistor 141. For driving the shaft 44 and the rack and pinion gearing 135, a motor 136 is provided. For controlling the motor 136 a differential amplifier of conventional form 137 is provided, which is represented schematically by a rectangle. The comparison device or differential amplifier 137 has a pair of input connections, one of which is the conductor 97 from the azimuth correction summation amplifier 94, and the other of which is a flexible conductor 138 connected to the brush 134. The differential amplifier 137 has an output connection through a cable 139 to the motor 136. The arrangement is such that in the event of difference in voltage between the conductors 97 and 138, the motor 136 is driven in one direction or the other by the voltage from the differential amplifier output until the voltage at the brush 134 balances that of conductor 97, in which case the output of the amplifier has a zero value and the motor stops. The angular position of the shaft 44 then represents the computed necessary correction of gun position in azimuth.

The electromechanical conversion unit 18 is similar to the unit 17 and need not, therefore, be described in detail.

For adding the angular correction in azimuth appearing at the shaft 44 to the present position in azimuth of the target represented by the angular position of the shaft 28, the differential 43 is provided which operates in a conventional manner one input thereof being actuated by the tracker azimuth shaft 28 and the other by shaft 44. The output of the differential actuates gun azimuth shaft 57 and computer shaft 45 according to the sum of the input displacements, which is the required angular position in azimuth for the gun 53. Similarly, the differential 47 combines the correction in elevation appearing at the shaft 48 with the present position in elevation of the target appearing at the shaft 46 the output of differential 47 positioning the gun elevation shaft 58 according to the required angular position of the gun in elevation.

Although the requisite variations in resistance per unit length of the path of the brush of the several potentiometers shown within the electrical computing mechanism 15 may be obtained in any desired manner, I prefer to obtain the desired characteristic in resistance for the respective potentiometers by utilizing resistance wire of uniform resistance per unit length, uniformly wound on suitable forms with the taper in resistance obtained by suitably shaping the contour of the winding form. For example, the resistance may be wound upon flat cards of non-conducting material. In the case of the potentiometer 2a for introducing the effect of range in windage, the relationship between resistance and linear position of the brush 73 measured from the grounded end of the resistor 72 is preferably expressed by a formula approximated by the equation $$r = D_0^n$$

where $D_0$ is the range and therefore proportional to the linear position of the brush 73 driven by the range shaft 61, $r$ is the resistance in question, and $n$ is a constant depending upon the projectile and greater than unity. This equation is represented by the curve illustrated in Fig. 2a—r, in which vertical distance represents resistance and horizontal distance represents brush travel. In order to obtain this variation of resistance per unit length of the path of the brush, however, it is necessary when employing a suitably shaped card wound with uniformly spaced uniform resistance wire, to utilize a card, the width of which varies in accordance with the $(n-1)$ power of distance measured along the card length, as illustrated in Fig. 2a—w. In this curve the vertical distance $w$ represents card width and the horizontal distance $D_0$ represents brush travel along the length of the card which is proportional to range.

The requisite variations in resistance and card width with range for the potentiometer 2b are represented in the graphs of Figs. 2b—r and 2b—w. Likewise, the variations in resistance and card width for the potentiometer 2c are illustrated in Fig. 2c.

In the case of the potentiometer 3a requiring voltage reversal, the resistance curve is represented in Fig. 3a—r with a ground connection indicated at the center of the curve to indicate that a reversing polarity connection is required. For this purpose the card width shown in Fig. 3a—w is a maximum at the center and tapers off along reversing-slope curves to minimum width at the end. The resistance variations and card width variations required to obtain a secant curve are shown in Figs. 3b—r and 3b—w. In Figs. 3a and 3b the distance measured vertically represents resistance or card width, and the distance measured horizontally represents gun position in azimuth.

In Figs. 4a, 4b and 4c are shown the requisite resistance variations and card width variations with gun position in elevation to obtain the voltage variations in accordance with secant law, cosine law, and sine law, respectively.

The movably mounted radiator 11 tracks the target as the target moves or as relative motion takes place between the target and the aircraft or ship on which the tracking apparatus and gun may be mounted. The resultant motions of the tracker in azimuth and elevation are converted into rotations of the shafts 28 and 31 and the rates at which motions take place are converted into voltages appearing at the rate terminals 41 and 42. The differential 43 combines the present position of the target in azimuth represented by the angular position of the shaft 28, with whatever correction is necessary to cause a projectile from the gun 53 to hit the target. The requisite angular correction in azimuth is represented by angular position of the shaft 44. The sum of the motions to the shafts 28 and 44 appears as the motion of the shaft 45 representing the requisite gun position in azimuth. In a similar manner, the position of shaft 49 represents the requisite gun position in elevation.

It will be observed that there is a partial mechanical feedback, that the computer 15 produces angular rotations of the shafts 44 and 48 representing the necessary correction in gun position, and that these shaft positions in turn affect the positions of the shafts 45 and 49 which determine, in part, the necessary correction. However, the differences between the angular positions of the shafts 44 and 28 and likewise between the shafts 48 and 46 are relatively small, so that the change in rotation fed back is relatively small and the apparatus quickly reaches an equilibrium. It will be understood that preferably suitable anti-hunting devices are provided to prevent hunting or back and forth rotation of the shafts about an average value. Such anti-hunting apparatus is not illustrated as it may be arranged in a conventional manner and does not form a part of my present invention.

The angular positions of the shafts 61, 45 and 49, determine the positions of the potentiometer brushes, and set in electrically, the various factors required to take into consideration the effect of range and gun position on ballistics of the gun and rate of motion of the target.

Considering, for example, the windage correction in azimuth, the potentiometers 66, 2a, 3a and 4a are so cascaded as to multiply the four factors represented by the four potentiometers. Thus the voltage on the brush 69 is a function of altitude and indicated air speed. The fraction of the total resistance of the resistor 72 between the ground connection and the brush 73 is a function of range representing the time of flight correction. Since the potentiometer 2a is energized by the brush 69, the voltage on the brush 73 is a product of the two factors introduced by the potentiometers 67 and 2a. In a similar manner, the potentiometer 3a introduces the azimuth factor so that the voltage on the brush 77 is a product of three factors introduced by the potentiometers 67, 2a and 3a. Likewise, the potentiometer 4a introduces a fourth factor in elevation causing the voltage on the brush 88 to be the product of all of the factors just mentioned.

The potentiometers 2b and 4b introduce a voltage which is a product of these potentiometers. Likewise, potentiometers 3b and 4c introduce two different factors in the output voltage appearing at the brush 73 of the potentiometer 2a so that the elevation windage correction represented by the voltage at the conductor 127 is the product of the appropriate factors.

As already mentioned, the summation amplifiers 124 and 125 add appropriate corrections algebraically so that the output voltages at the conductors 97 and 129, respectively, represent the total corrections which must be made in gun position in order that the projectile will strike the target.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. An electric fire control system for use against relatively moving targets comprising a radio tracker having an output continuously adjustable in accordance with target range, and also two further outputs proportional to present position of the target in azimuth and elevation respectively, a generator actuated by the azimuth output for producing a voltage proportional to the rate of change of the angular position of the target in azimuth, a second generator actuated by the elevation output for producing a voltage proportional to the rate of change of the angular position of the target in elevation, means actuated by the first mentioned output for converting both of said voltages into voltages respectively proportional to azimuth and elevation prediction components of corresponding lead angles, ballistic computing means actuated according to gun azimuth and gun elevation angles and also controlled by the first mentioned means for producing discrete voltages proportional respectively to the required ballistic components of the azimuth and elevation lead angles, azimuth and elevation summation circuits for adding corresponding prediction and ballistic voltages to obtain thereby voltages respectively proportional to the required lead angles in azimuth and elevation, respective means controlled by the latter voltages for producing corresponding proportional mechanical movements, a pair of adding differential mechanisms having corresponding input members actuated respectively by the tracker in accordance with the angular position of the target in azimuth and elevation, and other corresponding input members actuated by corresponding mechanical motions of the last mentioned means, output members for the respective differential mechanisms displaced respectively according to gun aiming angles in azimuth and elevation, and mechanical connections for regulating the ballistic computing means according to gun angles in azimuth and elevation operatively connected to the output connections of the differential mechanisms.

2. An electric fire control system for use against relatively moving targets comprising a target tracker having outputs proportional to range and present angular position of a target, generator means actuated by the tracker for producing voltages proportional to the rate of change of the angular position of the target, a source of current of substantially constant voltage, ballistic potentiometers energized by said constant voltage source for producing voltages proportional to the ballistic components of lead angles, prediction potentiometers energized by said rate voltages for producing voltages proportional to prediction corrections in angular gun position, a summation circuit for combining said ballistic and prediction correction voltages to produce voltages proportional to correction in angular gun position, means for converting said correction voltages into proportional mechanical motions, means for combining said mechanical motions with the present position output motion of the tracker to produce gun position motion, and mechanical connections controlled by the latter means and the range output for operating said ballistic potentiometers in accordance with range and gun position for adjusting the output ballistic voltages fed into the summation circuit, and means operated by the range output means for adjusting the prediction potentiometers to modify the prediction voltages fed therefrom into the summation circuit to correct for variations in gun position and target range.

3. An electric fire control system comprising a target tracker having a mechanical motion output proportional to present angular position of a target, generator means actuated by the output for producing a voltage proportional to the rate of change of present position of the target, a source of voltage of substantially constant value, potentiometer means for producing a ballistic correction voltage, energized by said constant voltage source potentiometer means energized by said rate voltage for producing voltages proportional to requisite corrections in gun position according to prediction correction components, a summation circuit for combining said ballistic and prediction corrections to produce a voltage proportional to total correction in gun position, means for converting said total correction voltage into a mechanical motion, differential means actuated by the latter means and by the tracker for combining said mechanical motion with the present position output motion of said tracker to produce gun position motion, and mechanical connections for operating the first mentioned potentiometer means in accordance with gun position motion for adjusting the output voltages fed into the summation circuits to correct the ballistic correction voltage for changing angular gun position.

4. In a fire control computer, means for producing a voltage proportional to windage correction, comprising a potentiometer with a resistance distribution in accordance with a power function of range representing the time of flight factor in windage correction, connections for energizing said potentiometer, a brush cooperating with said potentiometer and movable therealong in accordance with variation in range of a target, a second potentiometer comprising a resistance distributed in accordance with angular windage correction and a brush movable therealong in accordance with variation in angular position of a target, and coupling means interposed between said second potentiometer and said first brush whereby a voltage proportional to the windage correction appears at said last-mentioned brush.

5. In a fire control computer, means for producing a voltage proportional to the windage correction in azimuth comprising a potentiometer, means for energizing the potentiometer in accordance with a function of altitude and indicated air speed, a brush slidable along said potentiometer in accordance with range, said potentiometer being wound in accordance with a power function of range representing the time of flight factor in windage correction, a second potentiometer wound in accordance with a function representing the effect of azimuth on the azimuth windage correction, an isolating amplifier interposed between the brush of the first potentiometer and the ends of the second potentiometer, a second brush driven along said second potentiometer in accordance with variations in azimuth, and a third potentiometer comprising a resistance wound in accordance with a secant function and a brush movable along the resistance in accordance with variations in elevation, said last-mentioned resistance being connected electrically to the brush of the second potentiometer.

6. A fire control computer comprising a potentiometer with a resistance distribution in accordance with a power function of range representing the time of flight factor in windage correction, a source of current energizing said potentiometer, a brush driven along said potentiometer making contact with said resistance moving in accordance with variations in range of a target, a second potentiometer comprising a resistance distributed in accordance with the azimuth factor in the windage correction and a brush movable along said resistance in accordance with variations in azimuth of the target, an isolation amplifier interposed between said first brush and said second resistance, and a third potentiometer comprising a resistance according to the secant law with means for energizing the potentiometer from said second brush and a brush movable along said last-mentioned resistance in accordance with elevation of a target, whereby a voltage proportional to the windage correction appears at said last-mentioned brush.

7. An electrical computer for multiplying a voltage by the secant of a variable quantity, said computer comprising positive and negative input connections for supplying a voltage to form one factor of a computation, a resistor having a variable rate of change of resistance along the resistor, said rate being a minimum at the middle of the resistor and increasing to a maximum towards the ends of the resistor, a second resistor, and a brush movable along said first resistor in accordance with variations in a quantity forming a second factor of the computation, said first resistor having end terminals, both connected to the first of said input connections, said second resistor being connected in series between the second of said input connections and the mid terminal of said first resistor, said brush and said second connection serving also as output connections at which a voltage appears representing the result of the computation.

8. An electrical computer for multiplying a voltage by the sine of a variable quantity, comprising a pair of input connections to be energized by a source of voltage forming one factor of the computation, a unidirectional-output amplifier having a pair of input terminals and a pair of output terminals, said input connections being connected to said input terminals, a resistor having an intermediate terminal and having end terminals connected to said amplifier output terminals, and a brush movable along said resistor in accordance with variations in a second quantity forming the second factor of the computation, said resistor having a variable rate of change of resistance along the length thereof, said rate of change being a maximum at the intermediate portion and decreasing to a minimum toward the ends in accordance with the sine law, whereby an output voltage appears between said brush and said intermediate terminal proportional to the result of the computation to be carried out.

9. An electrical computer for producing a voltage proportional to the product of a voltage and the cosine of a variable quantity forming a second factor of the computation, said computer comprising a pair of input connections for supplying a voltage to form the first factor of the compuation, a resistor having end terminals and a mid terminal, and a brush movable along said resistor in accordance with the quantity forming the second factor of the computation, one of said input connections being connected to said mid terminal and the other being connected to the end terminals of the resistor, said resistor having a variable rate of change of resistance along the length thereof which is a minimum at the middle of the resistor and increases toward the ends of the resistor in accordance with the cosine law, whereby the voltage appearing on the brush represents the result of the computation to be carried out.

10. An electric device for computing lead angles for an airborne gun including ballistic deflection circuit means which comprises a pair of interconnected potentiometers adjusted respectively according to the position of the gun in elevation and azimuth, means for energizing the potentiometers by a voltage modified in accordance with indicated air speed and altitude of the supporting aircraft and target range, the potentiometers being so laid out as to provide an output voltage proportional to the azimuth ballistic deflection, line of sight defining means for tracking a target, means controlled thereby for providing a voltage proportional to azimuth prediction, and servo means jointly controlled by the prediction and ballistic deflection voltages for offsetting the gun in azimuth from the line of sight in accordance with the total lateral deflection component of the lead angle the pair of potentiometers being readjusted with the angular movement of the gun to continuously equate the ballistic voltage to the angular position of the gun.

11. An electric device for computing lead angles for an airborne gun comprising circuit means including a potentiometer adjusted by movement of the gun in azimuth, a second potentiometer in circuit therewith adjusted by movement of the gun in elevation, means for energizing the potentiometers with a voltage modified according to target range, the potentiometers being so laid out as to provide an output voltage proportional to the lateral ballistic deflection, means for defining a line of sight to a target, generator means actuated thereby for providing a voltage proportional to azimuth rate of the target, a potentiometer energized by the rate voltage laid out according to a power function of range representing the time of flight factor in prediction correction and adjusted according to target range for providing an output voltage according to lateral prediction deflection, and means jointly controlled by the line of sight defining means, and by both lateral ballistic and prediction voltages for offsetting the gun from the line of sight in azimuth according to the azimuth lead angle and thereby readjusting the first two potentiometers to constantly equate the ballistic voltages to the instantaneous angular position of the gun.

12. An electric device for computing lead angles for an airborne gun comprising circuit means including a potentiometer adjusted by the gun in fixed relation therewith in azimuth, a second potentiometer in circuit therewith adjusted by the gun in fixed relation therewith in elevation, means for energizing the potentiometers with a voltage modified according to target range, and air speed of a supporting aircraft corrected for air density, the potentiometers being so laid out as to provide an output voltage proportional to the lateral ballistic deflection, means for defining a line of sight to a target, generator means actuated thereby for providing a voltage proportional to azimuth angular rate of the target, a potentiometer energized by the rate voltage laid out according to a power function of range representing the time of flight factor in prediction correction, and actuated according to target range for providing an output voltage according to lateral prediction deflection, and means jointly controlled by the line of sight defining means, and by both lateral ballistic and prediction voltages for offsetting the gun from the line of sight in azimuth according to the azimuth lead angle the first mentioned potentiometers being adjusted by the angular movements of the gun to constantly equate the ballistic correction to changing angular position of the gun.

13. A computer for an airborne gun including a pair of interconnected potentiometers for computing lateral ballistic deflection, circuits therefor for controlling the energizing of the pair of potentiometers according to an indicated air speed value of the supporting aircraft corrected for air density, means actuated by the gun in fixed relation therewith for adjusting the potentiometers respectively according to the angular position of a gun in azimuth and elevation, a device for defining a line of sight to a target, and means jointly controlled by the output of the last-mentioned potentiometers and the line of sight defining device for offsetting the gun from the line of sight in azimuth in accordance with the output of the potentiometers and at the same time effecting readjustment of the pair of potentiometers automatically for changing gun position.

14. An electric device for computing lead angles for an airborne gun comprising circuit means including a potentiometer adjusted by the gun in fixed relation therewith in azimuth, a second potentiometer in circuit therewith adjusted by the gun in fixed relation therewith in elevation, means for energizing the potentiometers with a voltage modified according to target range, the potentiometers being so laid out as to provide an output voltage proportional to the vertical ballistic deflection, means for defining a line of sight to a target, generator means actuated thereby for providing a voltage proportional to rate of change of the target in elevation, a potentiometer energized by the last-mentioned voltage laid out according to a power function of range representing the time of flight factor in prediction correction and actuated according to range for furnishing an output voltage proportional to vertical prediction, and means jointly controlled by the line of sight defining means, and by both the vertical ballistic and prediction voltages for offsetting the gun from the line of sight in elevation according to the elevation lead angle the first two potentiometers being readjusted continuously to equate the ballistic voltage to the angular position of the gun.

15. An electric device for computing lead angles for an airborne gun comprising circuit means including a potentiometer having an adjusting member coupled with the gun so as to move therewith in azimuth, a second potentiometer in circuit therewith having an adjusting member coupled with the gun so as to move therewith in elevation, means for energizing the potentiometers with a voltage modified according to target range, and air speed of a supporting aircraft corrected for air density, the potentiometers being so laid out as to provide an output voltage proportional to the vertical ballistic deflection, means for defining a line of sight to a target, generator means actuated thereby for providing a voltage proportional to rate of change of the target in elevation, a potentiometer energized by the last-mentioned voltage laid out according to a power function of range representing the time of flight factor in prediction correction and means for adjusting the latter potentiometer according to range for furnishing an output voltage proportional to vertical prediction, and means jointly controlled by the line of sight defining means, and by both the vertical ballistic and prediction voltages for offsetting the gun from the line of sight in elevation according to the elevation lead angle the angular movement of the gun being effective to continuously adjust the first and second mentioned potentiometers for the purpose of equating continuously the vertical ballistic voltage to the instantaneous angular position of the gun.

References Cited in the file of this patent

UNITED STATES PATENTS

| | | |
|---|---|---|
| 1,322,153 | Wilson et al. | Nov. 18, 1919 |
| 1,345,702 | Routin | July 6, 1920 |
| 1,542,534 | Schneider | June 16, 1925 |
| 2,168,032 | Japolsky | Aug. 1, 1939 |
| 2,208,623 | Bond | July 23, 1940 |
| 2,399,726 | Doyle et al. | May 7, 1946 |

FOREIGN PATENTS

| | | |
|---|---|---|
| 218,549 | Great Britain | July 10, 1924 |
| 164,765 | Great Britain | June 23, 1921 |
| 167,191 | Great Britain | May 21, 1919 |
| 365,216 | Italy | Nov. 26, 1938 |